United States Patent [19]
Pearce

[11] 3,720,184
[45] March 13, 1973

[54] COMBINATION PET FEEDER FOR FLOWABLE SOLID MATERIAL AND LIQUID

[76] Inventor: Woodrow W. Pearce, 1200 Riverside Drive, Burbank, Calif. 91506

[22] Filed: Oct. 19, 1970

[21] Appl. No.: 81,997

[52] U.S. Cl. ................................. 119/51.5, 119/77
[51] Int. Cl. ....................... A01k 05/00, A01k 07/00
[58] Field of Search .................. 119/51.5, 52 R, 77

[56] References Cited

UNITED STATES PATENTS

| 993,630 | 5/1911 | Worsham et al. | 119/52 R X |
| 1,835,964 | 12/1931 | Pech et al. | 119/77 |
| 1,816,684 | 7/1931 | Liechty | 119/77 |
| 2,618,237 | 11/1952 | McDermott et al. | 119/77 X |

Primary Examiner—Hugh R. Chamblee
Attorney—Herzig & Walsh

[57] ABSTRACT

A pet feeder in the form of a feeding dish combined with containers for flowable materials which may be either liquid or granulated solid materials. The feeding dish has a slanting surface or ramp. A container for solid particulate material is positioned over the ramp to feed onto it. A liquid container having a discharge spout is positionable over the ramp which is provided with a flat ledge portion on which the spout normally rests, partially obstructing it and allowing flow through the remainder into the dish up to the level of the spout orifice. The liquid container is removable from the enclosure for filing and for use of the feeder for feeding solid material.

1 Claim, 4 Drawing Figures

PATENTED MAR 13 1973              3,720,184
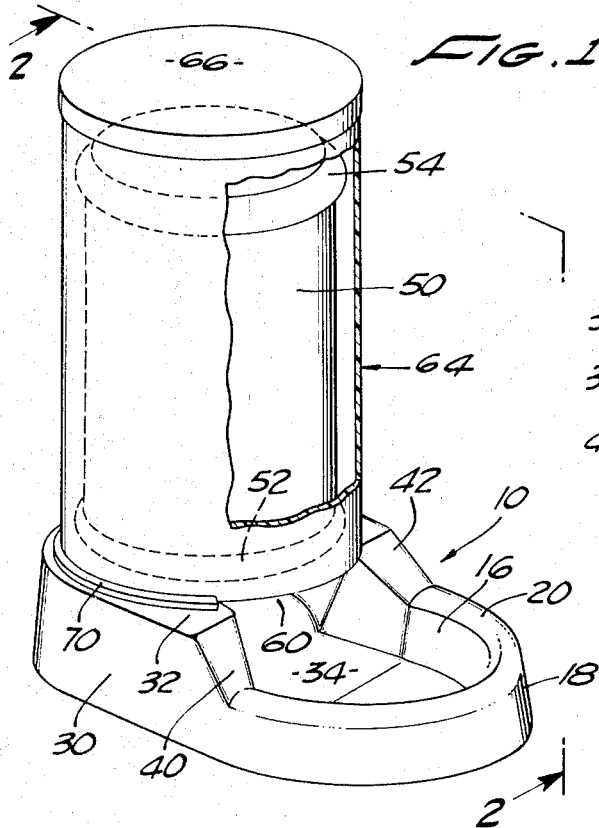
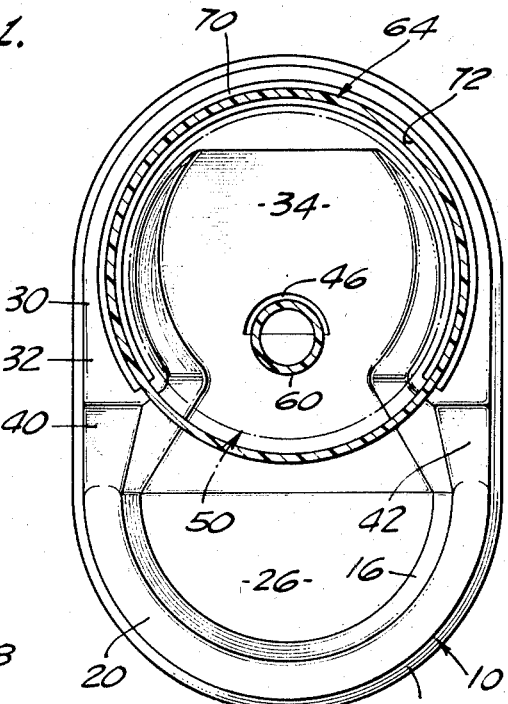
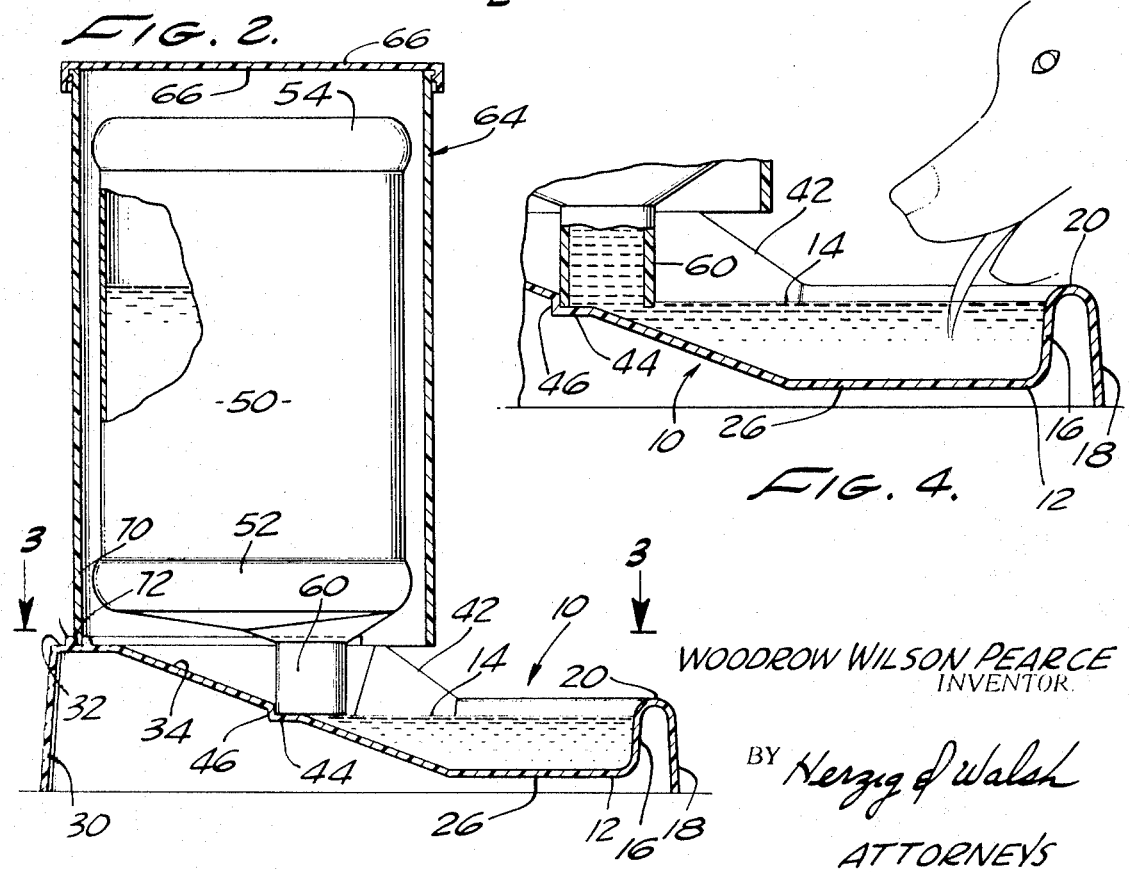
WOODROW WILSON PEARCE
INVENTOR.
BY Herzig & Walsh
ATTORNEYS

COMBINATION PET FEEDER FOR FLOWABLE SOLID MATERIAL AND LIQUID

SUMMARY OF THE INVENTION

The invention is an improved pet feeder for animal pets, such as dogs, cats, etc. The feeder is a combination feeder comprising a feeding dish with automatic feeding means for feeding a flowable material, such as a liquid or granulated solid material into the feeding dish up to a desired level. The automatic feeding means comprises cylindrical containers including a liquid container having a feeding spout or nozzle, the liquid container normally being supported in an inverted position. The feeding dish has a slanting surface or ramp having formed in it an intermediate point, a flat surface forming a ledge and shoulder, and the spout of the liquid feeding container is normally supported on this ledge so as to partially obstruct the orifice in the spout and to allow flow through part of it into the feeding dish. Preferably, the liquid container is cylindrical and it is positionable within a cylindrical container or enclosure of larger diameter with a removable closure so that the liquid container can be removed for refilling and reinsertion. With the liquid container removed, solid particulate material can be put into the other container for automatic feed onto the ramp and into the dish.

The primary object of the invention is to provide a combination pet feeder as referred to possessing the characteristics that it will reliably feed either liquid or solid material accurately into the feeding dish, but yet possess the characteristics that it is extremely simple and economical to fabricate; that it is completely sanitary; and that it is very easy to refill or reload it with a fresh supply of liquid or solid material.

Another object is to realize the characteristic that it is extremely simple to convert the feeder for feeding either solid or liquid material.

A further object is to provide a construction embodying a container for liquid having a spout, the feeding dish having a ramp with a ledge forming a platform and shoulder on which the spout normally rests to controllably feed liquid.

A further object is to provide a construction in a pet feeder as described which is adapted to use of inexpensive plastic materials and to fabrication of the parts by plastic molding processes. A further object is to reduce the number of parts and to simplify individual parts.

BRIEF DESCRIPTION OF THE DRAWINGS

Further objects and additional advantages of the invention will become apparent from the following description and annexed drawings wherein:

FIG. 1 is a partially cut-away perspective view of a preferred form of the invention;

FIG. 2 is a sectional view taken along the line 2—2 of FIG. 1;

FIG. 3 is a sectional view taken along the line 3—3 of FIG. 2; and

FIG. 4 is a vertical sectional view through a part of the device of FIGS. 1 through 3.

DESCRIPTION OF THE PREFERRED EMBODIMENT

Referring to the drawings, numeral 10 designates generally the feeding dish part of the device. In the preferred form of the invention, the dish is generally of oval shape. Preferably, it is formed of thin molded plastic material. The forward part of the dish as designated at 12 is the part which receives the flowable material up to a level as shown at 14 in FIG. 4 to allow the animal to feed or drink therefrom. The forward part of the feeding dish is formed as shown in FIGS. 2 and 4 to have a double wall as designated at 16 and 18, connected by a smoothly rounded connecting portion 20 on top which forms a smooth rounded edge or surface, adapting it for the animal to place its head in a position as shown in FIG. 4. The forward part of the feeding dish has a flat bottom as designated at 26.

The rearward part of the dish is formed by relatively thin wall part 30, the peripheral parts having a generally flat top surface as shown at 32. The rear part of the dish has surface 34 forming a ramp extending from the back part of the rear portion to the flat bottom surface 26 of the dish. The flat top surface 32 is of generally horseshoe shape, the ends of this surface slanting down as shown at 40 and 42 to join the ends of the top rounded surface 20 of the feeding dish.

Formed in the ramp or slanting surface 34 at an intermediate point is a flat surface 44 forming a ledge having at the back an upright or shoulder 46.

Liquid material to be fed is contained in a cylindrical container 50 which may preferably be of plastic having enlarged ribs or bulges as shown at 52 and 54 at the top and bottom. At the top, offset to one side is a cylindrical discharge spout 60. The end of this spout normally rests on the flat ledge 44 with the spout against the arcuate shoulder 46 so that the orifice in the spout is partially obstructed; and through the unobstructed part, material can feed down along the ramp 34 into the feeding dish until the level which is the level as designated at 14 is reached.

As will be understood, when the level of material such as liquid reaches the level of the end of the spout 60, the interior of the container 50 is sealed against entrance of air, and the material will no longer automatically feed.

Numeral 64 designates a cylindrical enclosure for the container 50 which also may preferably be made from a relatively thin plastic material, having a circular cap or closure 66 which is removable. On the horseshoe shaped surface 32, there is formed a rib 70 having a groove 72 in it. The lower peripheral edge of the enclosure 64 is received in the groove 72, and it may be appropriately bonded thereto. The liquid container 50 is readily removable for placing solid particulate flowable material in container 64. Such material can flow down onto ramp 34 and then into the dish 10. The flow is controlled by the opening between the lower edge of container 64, the ramp 34, and the ends 40 and 42 of the horseshoe shaped surface 32.

In use for liquid, the container 50 is in the position as shown in the enclosure 64 with the spout 60 resting on the ledge 44. The liquid material will automatically feed into the feeding dish up to the level 14. Whenever the level falls, additional liquid material will automatically feed back up to the level 14.

To refill the container 50, the cover 66 need only be removed, and the container can be manually taken out, refilled through the spout 60, and then replaced back into position as shown in FIG. 2.

To convert the combination pet feeder for solid material, container 50 is simply removed and the solid material is placed in container 64. It feeds down as described onto ramp 34 and is controllably released into dish 10.

From the foregoing, those skilled in the art will readily understand the nature and construction of the invention and the manner in which it achieves and realizes the objectives as set forth in the foregoing. The construction is extremely simple, economical, and easy to fabricate. It comprises only the feeding dish, the attached enclosure 64, and the removable container 50. No supports for the container 50 are required other than the ledge on the ramp 34. The device feeds either liquid or solid material reliably without attention, and is extremely easy to convert from one to the other. The device is sanitary and extremely easy to clean; particularly, it is easy to refill it.

The foregoing disclosure is representative of a preferred form of the invention. It is to be interpreted in an illustrative rather than a limiting sense.

What is claimed is:

1. A combination pet feeder for feeding flowable solid or liquid materials comprising: a removable cylindrical container adapted to contain solid flowable material; a feeding dish into which material can be fed, said dish including a part forming a ramp at one side of the dish and there being raised side walls partially around the ramp, said removable container being positioned over the ramp and retained by said side walls whereby solid material flowing onto the ramp moves into the dish to be accessible to an animal; and a cylindrical liquid container positionable in said removable container and having discharge means positioned to discharge onto said ramp whereby to cause liquid to flow into the dish to a predetermined level, said liquid container having a neck part and the ramp having a recessed flat part adapted to receive a neck end portion of the container thereon to allow flow of liquid from the neck.

* * * * *